E. G. DIHLMANN.
SHOE PRESS.
APPLICATION FILED FEB. 24, 1917.
1,272,019.
Patented July 9, 1918.
4 SHEETS—SHEET 1.
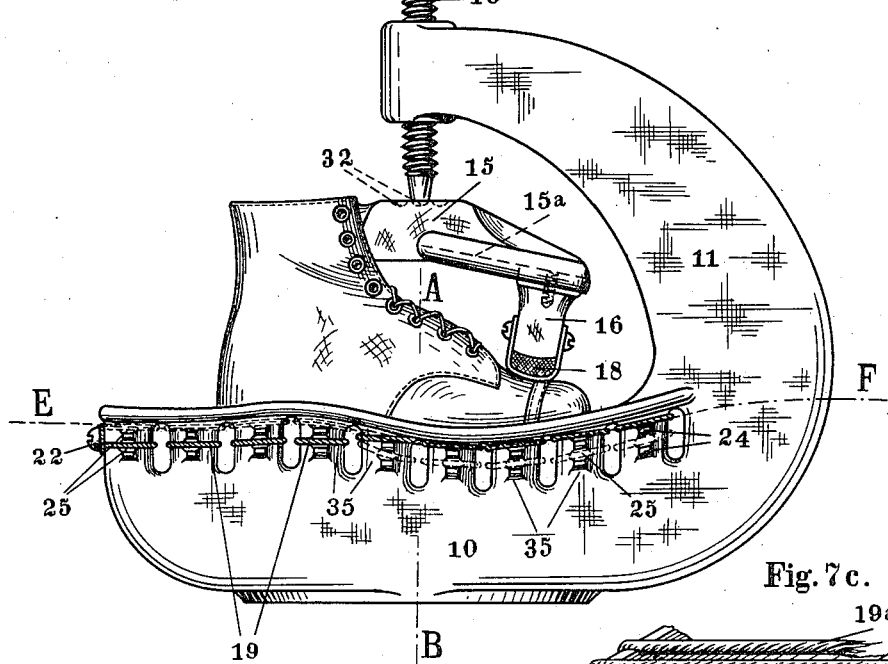
Fig. 1.
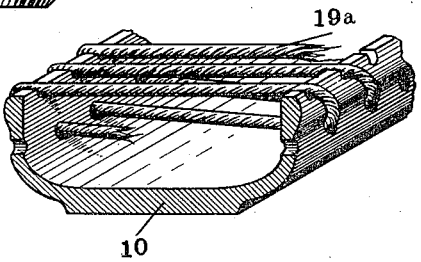
Fig. 7c.
Fig. 2.
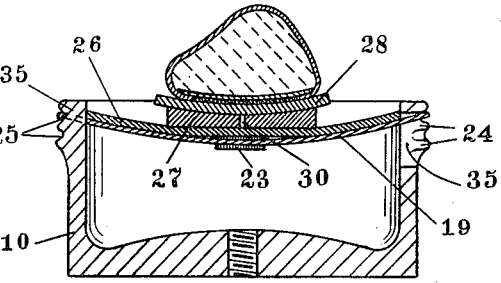
Witnesses
Inventor

E. G. DIHLMANN.
SHOE PRESS.
APPLICATION FILED FEB. 24, 1917.

1,272,019.

Patented July 9, 1918.
4 SHEETS—SHEET 2.

Witnesses
Inventor
Eugen Gottfried Dihlmann

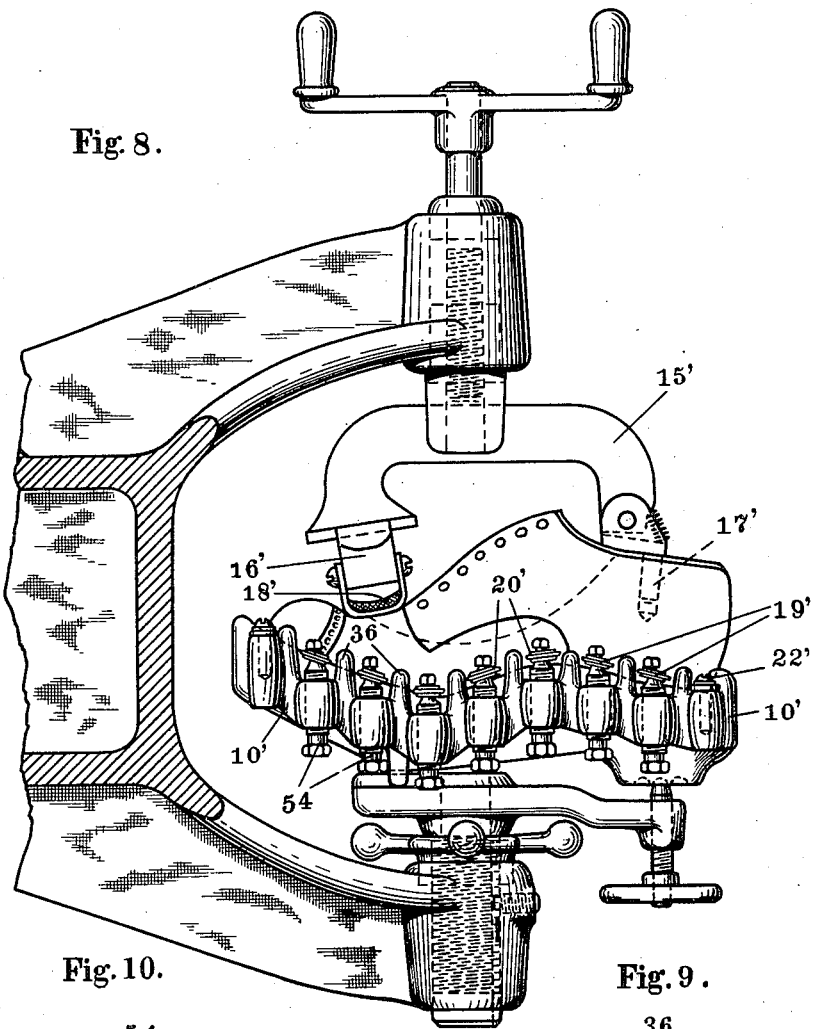
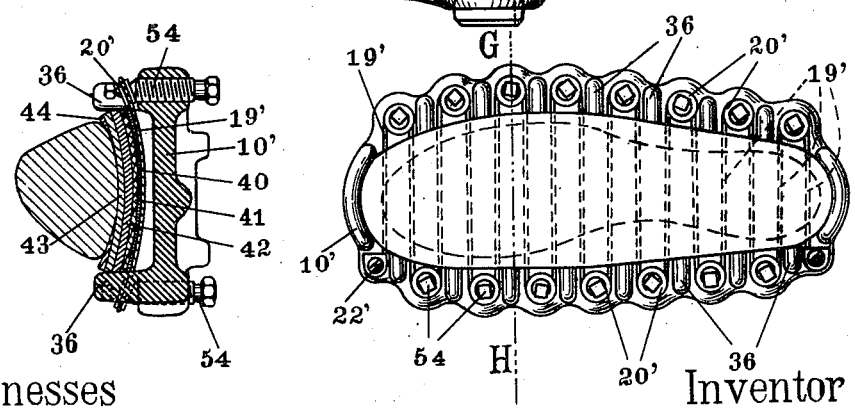

E. G. DIHLMANN.
SHOE PRESS.
APPLICATION FILED FEB. 24, 1917.
1,272,019.
Patented July 9, 1918.
4 SHEETS—SHEET 4.
Fig. 11. 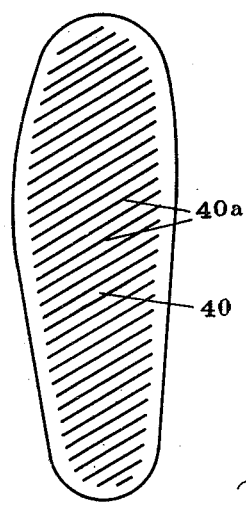 Fig. 12. 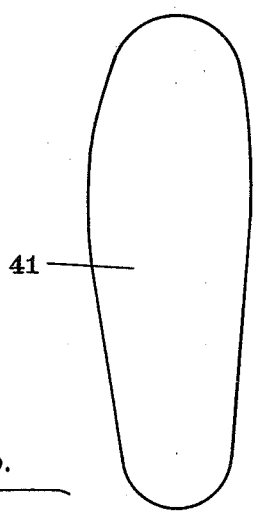
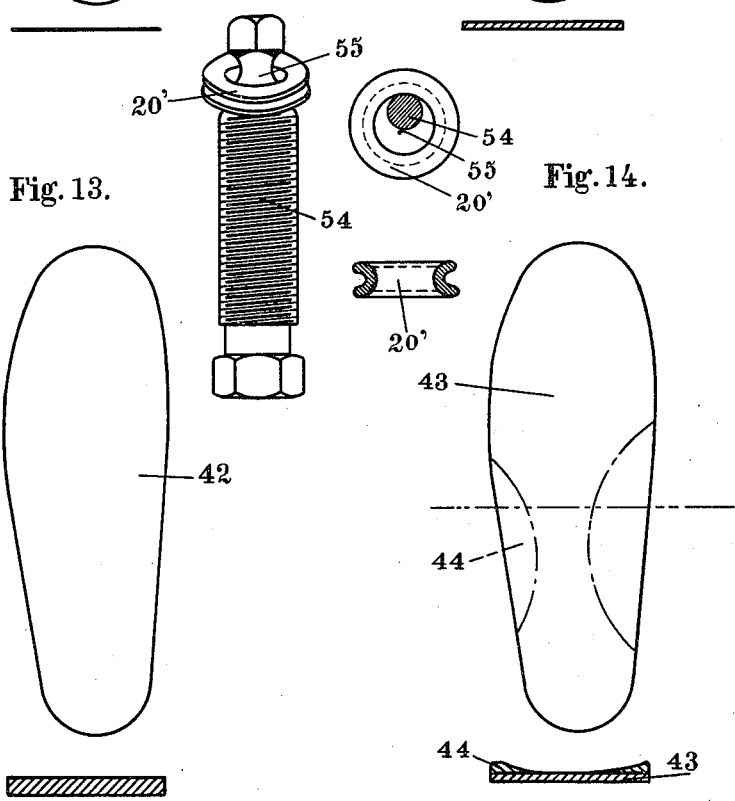
Witnesses
A. Stahl
Paul Fritzsche
Inventor
Eugen Gottfried Dihlmann

UNITED STATES PATENT OFFICE.

EUGEN GOTTFRIED DIHLMANN, OF LEIPZIG-REUDNITZ, GERMANY.

SHOE-PRESS.

1,272,019.

Specification of Letters Patent.

Patented July 9, 1918.

Application filed February 24, 1917. Serial No. 150,853.

*To all whom it may concern:*

Be it known that I, EUGEN GOTTFRIED DIHLMANN, a subject of the King of Wurttemberg, residing at Leipzig-Reudnitz, in Germany, have invented certain new and useful Improvements in Shoe-Presses, of which the following is a specification.

This invention relates to appliances suitable for the manufacture of shoes and boots and is adapted to press the sole against the edge portion of the lasted upper for the purpose of sticking or gluing the said parts together without requiring the application of a tacking or stitching operation. To obtain a sufficient connection only by gluing, the parts must be pressed together with a considerable pressure which is in the entire area uniform, and so held for a convenient time to allow hardening and drying of the adhesive.

The object of the invention is to provide, in an apparatus of this kind, means adapted to forcibly hold the parts against each other, but permitting their adjustment in different ways for the purpose of apportioning the pressure about the entire joint, as required according to the shape and position of the several places thereof.

A further object of the invention is to provide a support for the sole of high adaptability, but which is unyielding after being applied to the sole with its entire contacting surface.

To attain these objects, the invention consists in combination with a press of convenient construction, of a sole-support having a number of interconnected and respectively adjustable elements in the form of strips or the like. Coöperating with this support is a movable pressing member capable of forcing the shoe and sole upon the said support.

Several embodiments of the invention are illustrated as examples in the accompanying drawings, which form a part of this specification and in which—

Figure 1 is a side elevation of a press constructed in conformity with the invention;

Fig. 2 illustrates a vertical cross section of the support on the line A—B of Fig. 1;

Figure 7B:
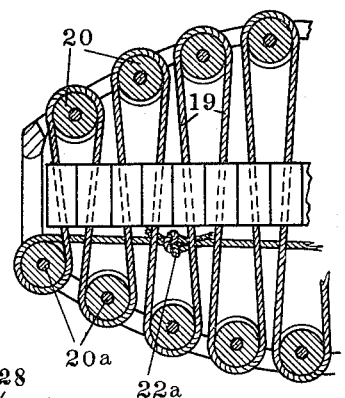
Figure 7A:
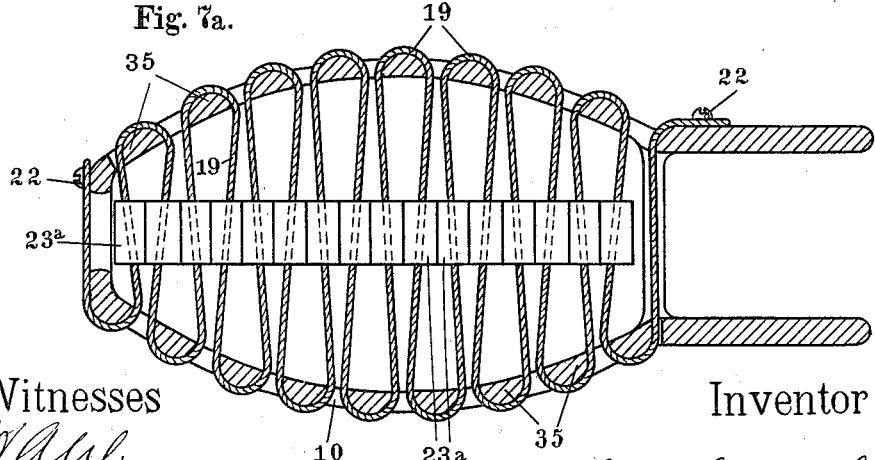

Fig. 7ª illustrates a horizontal section of the support on the line E—F of Fig. 1;

Fig. 7ᵇ is a similar partial section of a modification of said support;

Fig. 7ᶜ is a partial sectional and perspective view of a further modification of the support;

Fig. 8 is a side elevation of another embodiment of the invention and illustrates a press together with the support and the pressing member of the modified construction;

Fig. 9 is a top view of the support shown in Fig. 8;

Fig. 10 represents a cross-section of the support on the line G—H of Fig. 9 and a last pressed thereupon;

Figs. 11–14 illustrate top views and the respective cross-sections of the single layers of a laminated liner; and Fig. 15 shows a screw bolt and the pertinent guide-ring in a vertical side elevation, a top view and a cross-section, respectively.

Similar numerals designate similar parts throughout all figures of the drawings.

Figure 3:
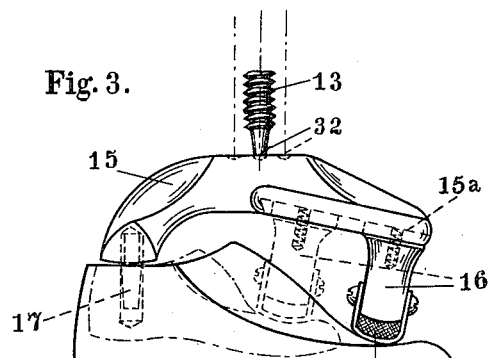
Fig. 3 is a side view of the pressing member in its operative position upon a last.
Figure 4:
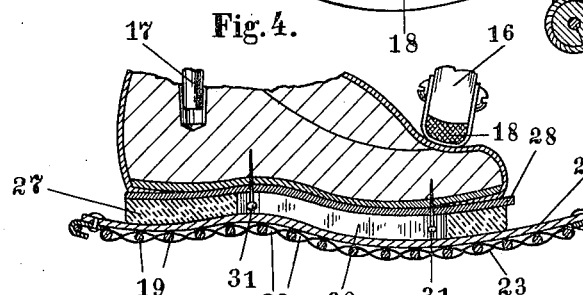
Fig. 4 represents a vertical sectional view of a lasted shoe and parts of the combined support.
Figure 5:
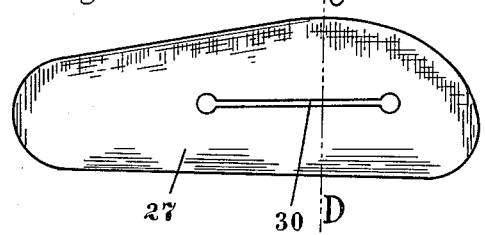
Figs. 5 and 6 are respectively a top view of a yielding liner and a cross-section, on the line C—D of Fig. 5.
Figure 6:
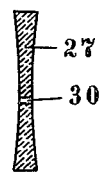

Referring to the construction illustrated in Figs. 1 to 7, the appliance for sticking the sole to the upper part of the footwear consists of a cushion 10 and a press arranged in front of the operative face of said cushion and adapted to press the work piece against the supporting face of the cushion. The press is mounted upon an arm 11 which may be made in one piece with the body of the press cushion as shown in Fig. 1 or may be in any way brought to engage therewith, as illustrated in Fig. 8. The arm 11 carries a spindle 13 provided with operating means, such as a hand wheel or a cross head with handles 14. The spindle 13 acts upon the shoe by means of a loose yoke 15 which is provided at its fore end with a standard or support 16 fitted with a yielding bearing member or pad 18 to prevent hurt of the upper upon which it bears, and is fitted at its rear end with a pin 17 engaging the last (Figs. 3 and 4). The support 16 is movable in an inclined, for example, dove-tailed guide way 15ª of the yoke 15 in the longitudinal direction thereof, so that its adjustment for all sizes of lasts may be easily effected as shown by dotted lines in Fig. 3, the standard 16 thereby being placed not only at the required distance from the pin 17 but also at different heights, according to the inclination of the guide.

On its top face the yoke 15 is provided with several recesses 32 arranged side by side in the longitudinal direction any one of which the lower end of the screw spindle 13 may engage. According to the size of the footwear to be produced and according to the desired distribution of the pressure upon the front and the rear parts of the footwear, the spindle 13 is inserted into some one of the recesses.

The supporting means of the press cushion consists of a cord lacing which is passed to and fro in a winding line across the upper opening of the frame 10, the loops of the cord being passed around spaced uprights 35 of the side walls. (Fig. 7ª.) The cord or rope 19 of wire or any other suitable material (Figs. 1 and 2) is held in notches 25 confined by ribs 24 or the like and has its ends fixed to the frame-body 10 by means of screws 22. Instead of this particular way of rigidly fixing the ends of the cord, a certain further mobility may be obtained by connecting to one another the two ends 22ª of the cord 19 (Fig. 7ᵇ). The portions of the cord 19 extending between the sides of the body 10 and which may be parallel or nearly parallel form separate and spaced but interconnected supports for the single places of the sole. The turns or loops of the cord 19 thus present a continuous lacing in the upper opening of the body 10. The continuity of all the turns is essential as regards the particular action of the supporting surface, which supporting surface is normally slack or loose, but will be automatically and uniformly tensioned, when a shoe is pressed thereon.

If a greater mobility of the cord is desired than such as may be obtained by passing the turns around the semicylindrical stationary standards 35, rollers 20 may be used (Fig. 7ᵇ) about which the cord is passed and guided in convenient grooves thereof which correspond to the notches 25 in Fig. 2. The said rollers are mounted on bolts 20ª attached to the frame 10.

It will be easily understood that the cord may be replaced by any other tension member of great length and sufficient flexibility, such as a band, a chain, a belt or the like. The turns of the cord 19ª may also be arranged, similarly to a spiral line, upwardly and downwardly, when the upper portion thereof only will serve as the supporting means, as illustrated in Fig. 7ᶜ.

A strip 23 made of leather, fabric or the like and provided with corresponding perforations or pockets 23ª, serves as a further guide for the turns of the cord and prevents their displacement. Preferably a leather plate 26 is placed above the lacing as a top cover (Figs. 2 and 4). Upon this cover 26 rests a press support or liner 27 of felt, India-rubber or the like, which substantially corresponds to the form of the sole. It may be used for rights and left footwear by being adapted to be reversed. It is particularly advantageous to make the press liner 27 smaller than the sole of the shoe so that the edge portion of the sole 28 projects beyond the edge of the press liner 27 and is consequently not pressed upwardly toward the sides of the upper, so that its usual flat condition is not removed, because the pressure produced by the press acts only upon the proper sticking points between the upper and the sole at a certain distance from the edge of the sole (Figs. 2 and 4).

The liner 27 is conveniently provided with a longitudinal slot 30 or a similar recess (Figs. 5 and 6), so that it can join closely the sole at the joint. Moreover this arrangement provides for space for projecting nails 31 (fixing-tacks), which project into the said recess 30, as shown in Fig. 4. The liner may be made somewhat thinner in the middle (Fig. 6), this resulting in a closer adaptation to the sole. In making repairs, for instance, by sticking on a half-sole, instead of the whole liner 27 only a half one of suitable form is used, so that the heel is not in the way.

The employment of a continuous cord or the like, the turns of which are vertically displaced and adjusted in accordance with the pressure exerted at the various points of the curvature of the sole and are finally uniformly tensioned by their longitudinal displacement, has the advantage that the supporting surface which thereafter is substantially rigid, exerts a uniform pressure upon the whole under-side of the sole, whereby the sticking of the sole at all points is assured. The peculiar construction of the body 10 has the further advantage that the various turns of the cord 19 may be inserted from one notch 25 into another higher or lower notch, as shown in dotted lines in Fig. 1. By this simple and easily performable adjustment the supporting surface of the press cushion may rapidly be changed for a different curvature of the last, even in cases in which the adjustment is to be made only in the joint part.

In the construction shown in Figs. 8 to 15 at both longitudinal sides of the frame body 10' of the cushion, are arranged a suitable number of strong screw bolts 54 which may be adjusted vertically in corresponding female threads provided in the frame, so that the guide rollers 20' which are mounted on the upper ends of the bolts may be set in various vertical positions according to the curvature or ascending arch of the bottom of the shoe to be worked upon. Each roller 20' is mounted with its comparatively large bore upon a conical or grooved neck 55 of a bolt 54, this mounting enabling the rollers to adjust themselves automatically to any required angle and direction according to the pull exerted by the cord 19' guided in the grooves of said rollers 20'. This mobility of the rollers enables the several cord turns to fit closely against the sole and prevents the cord from sliding off or being damaged. Moreover after the boot or shoe has been fixed in the press by means of the pressure yoke 15'—18', the pressure upon individual parts of the sole may be increased by screwing the corresponding bolts 54 higher, or decreased by lowering same, the bolts being provided for this purpose at their upper and lower ends with prismatic heads for the application of wrenches. The supplementary correction of the adjustment allows little inaccuracies in the various work-pieces to be compensated for, thereby obviating failure of the cementing operation at the respective places.

A high uniformity of the pressing operation can be obtained by composing the press liner of a number of superimposed layers of different materials (Fig. 10). Upon the cord there is placed a loose, very pliant plate 40 of zinc, iron or steel sheet, in which incisures 40ª may be made to increase its flexibility (Fig. 11). Upon this sheet rests a plate 41 of hard cardboard, leather or the like; upon the latter is placed an elastic plate 42 of india-rubber, felt or the like, and the top layer consists of a plate 43 of leather or cardboard. All these parts of the press liner are arranged loosely upon the rope and are held in their proper positions by projections 36 provided upon the frame 10' between the rollers 20'. They may therefore be easily exchanged or if desired they may be placed in a different order. In the manufacture on a large scale, each form of footwear has a corresponding top leather plate 43 with reinforcements 44 at the joint part, (Fig. 14), which forms an exact bed for the sole of the boot. In place of this leather plate, a felt plate with a glued on leather plate may be used. The lateral guiding of the various parts of the liner renders a connection of the layers with the rope unnecessary and increases the range of the vertical adjustment of the supporting surface.

From the foregoing description in connection with the drawings it will be obvious that the invention is capable of various embodiments and that the support may be used with a press of any suitable construction.

What I therefore broadly claim as my invention is—

1. In a shoe press, a sole support composed of a number of tension elements which are interconnected so as to be capable of automatic adjustment to the shoe pressed thereon, while the tension is uniformly transmitted through all elements of the entire support.

2. In a shoe press, a sole support composed of a number of interconnected tension elements arranged side by side and normally loose, being adapted to assume a uniform tension and to accommodate themselves to the surface of a shoe pressed thereupon.

3. In a shoe press, the combination with a frame, of a continuous tension element interlaced in turns across the frame, adapted to assume a uniform tension throughout its entire length and to accommodate itself to the sole of a shoe pressed thereupon.

4. A shoe press, having a press support, composed of a frame and a continuous tension element interlaced in turns across the frame, and means adapted to press a shoe upon the support.

5. In a shoe press, the combination with a frame, of a continuous tension element interlaced in turns across the frame and forming the supporting surface for the shoe to be worked, means for adjusting the single turns in different heights, and means for pressing the shoe upon the support.

6. In a shoe press, the combination with a frame, of a tension element interlaced across the frame and forming the support for the shoe to be pressed, a liner placed between the support and the shoe, and means for pressing the shoe upon the support.

7. In a shoe press, the combination with a rigid body of a support, of a continuous tension element interlaced about said body in turns to and fro and forming the self-adapting supporting element for the shoe to be worked, a yielding liner located between the support and the sole of the shoe, and means capable of pressing the shoe upon the support.

8. In a shoe press, the combination with a support, having a rigid frame-body and a cord interlaced in normally slack turns about the frame-body and adapted to be a self-adapting supporting element for a shoe to be worked, of an interchangeable yielding liner arranged between the shoe and the supporting element, and means for pressing the shoe upon said support.

9. In a shoe press, a support, having a rigid frame, a cord interlaced in turns to and fro about the said frame, the said turns being individually adjustable in different heights, and a yielding liner located upon said turns and adapted to bear the shoe to be worked.

10. In a shoe press, a support for the shoe to be worked, having a rigid frame, a cord interlaced in turns to and fro about the said frame, means adapted to support the turns singly at different heights, and a yielding liner placed on said turns and capable of bearing the shoe.

11. In a shoe press, a support for the shoe to be worked, having a rigid frame, a cord interlaced in turns to and fro about said frame, means provided upon said frame and adapted to support the single turns, the said means being composed of elements which are adjustable independently of one another and are secured at different heights, and a yielding liner located upon the turns and capable of bearing the shoe.

12. In a shoe press, a support for the shoe to be worked, having a rigid frame, a cord interlaced in turns to and fro about the frame, guide pulleys for supporting the turns arranged upon said frame, and a yielding liner covering said turns and adapted to bear the shoe.

In witness whereof I have signed my name to this specification in the presence of two subscribing witnesses.

EUGEN GOTTFRIED DIHLMANN.

Witnesses:
RUDOLPH FRICKE,
R. H. SEAGLE.